F. H. RICHARDS.
MECHANICAL MOVEMENT.
APPLICATION FILED NOV. 14, 1902.

976,918.

Patented Nov. 29, 1910.

Witnesses:—
Herbert J. Smith
G. E. Maynard.

Inventor:—
F. H. Richards.

F. H. RICHARDS.
MECHANICAL MOVEMENT.
APPLICATION FILED NOV. 14, 1902.

976,918.

Patented Nov. 29, 1910.

Witnesses:—
Herbert J. Smith
F. E. Maynard

Inventor:—
F. H. Richards

F. H. RICHARDS.
MECHANICAL MOVEMENT.
APPLICATION FILED NOV. 14, 1902.

976,918.

Patented Nov. 29, 1910.

Witnesses:-
Herbert J. Smith
F. E. Maynard

Inventor:-
F. H. Richards

UNITED STATES PATENT OFFICE.

FRANCIS H. RICHARDS, OF HARTFORD, CONNECTICUT, ASSIGNOR, BY MESNE ASSIGNMENTS, OF ONE-HALF TO AMERICAN TYPOGRAPHIC CORPORATION, A CORPORATION OF ARIZONA TERRITORY.

MECHANICAL MOVEMENT.

976,918.          Specification of Letters Patent.     Patented Nov. 29, 1910.

Application filed November 14, 1902. Serial No. 131,303.

*To all whom it may concern:*

Be it known that I, FRANCIS H. RICHARDS, a citizen of the United States, residing at Hartford, in the county of Hartford and State of Connecticut, have invented certain new and useful Improvements in Mechanical Movements, of which the following is a specification.

This invention pertains to the kinematic relation inherent in an organization of devices in which two members or elements, one of which may have a capacity for a greater range or extent of movement than the other, are so related that although they are capable, the one relatively to the other, of assuming different conditions of rest or motion at the same instant, they are, nevertheless, adapted to engage at a predetermined point, and thereupon move for a period in synchronism.

More specifically, the present mechanical movement embodies a member capable of a to-and-fro movement and designed to coöperate with a second member (which prior to such coöperation is in a different condition of rest or motion) and after shifting such second member synchronously with it to one limit or end of its path of movement, to return the second member to the point or position at which such engagement occurred; the disengagement or separation of the two engaged members may thereupon ensue.

In the particular embodiment of the invention disclosed in the drawings attached to the present specification, the member herein-before referred to as the one which may have a greater range or extent of movement as compared with the other, is capable of a combined rotary and translational movement, as is also the member with which it is adapted to engage, this latter member, however, having capacity for a less amount of translational movement than the former. During the period prior to the engagement of the two and following their disengagement, the second member, that is the one capable of a lesser amount of translational movement, may remain stationary with relation to the fixed parts of the mechanism to which this mechanical movement may be applied, and although not essential to or involved in the principle in accordance with which the organization of devices operates, I prefer, as a matter of constructional detail, to provide means for locking the said second member in the event that it is desired that the same remain fixed against both rotation and translation.

In the accompanying drawings

Similar characters of reference designate corresponding parts in all figures.

The organization illustrated herein for the purpose of adequately disclosing the present invention is one in which the member carrying the actuator proper is capable of combined rotary and translational movement, the directions of which from a continuously rotating driver may be automatically reversed under the control of the moving member itself while the second or driven member with which the former member coöperates at some point in its travel, is likewise represented as susceptible of similar movements, which movements are likewise reversed, however, by reason of the continuance of the coöperation aforesaid. The former of the two members, that is the one carrying the actuator, may have an amount or extent of travel greater than that of the second or driven member, and the period during which the two move together, or the distance traversed during such synchronous movement, may be any desired part or fraction of the period consumed by the first member in completing a fully to-and-fro movement, or of the length of the path traversed thereby.

In the manufacture and assembling, moreover, of the various parts to form a complete and practical operative mechanism susceptible of application to conditions to the fulfilment of which it may be adapted, it is contemplated that such a degree of engineering and constructive skill shall be employed as to produce a proportion of parts and character of connections adequate to transmit the necessary forces and create the necessary rigidity and precision. The exercise of such skill on the part of the designer and constructor to meet various conditions may therefore result in mechanism the details of the construction of which differ from those illustrated in the drawings hereto attached, which are therefore to be taken in the sense of being illustrative only of these matters.

In the embodiment set forth in the present case, the various features comprised in the mechanism are for convenience of representation illustrated as mounted on a supporting base plate B, for which, manifestly, may be substituted the main or auxiliary framework of the particular machine to which the mechanism may be applied.

The member hereinbefore referred to as being directly actuated from the driver is designated by 2 and the construction of such member illustrated and which adapts it to the combined motion aforesaid comprises a threaded extension or shank 2′ which works in the threaded bore of an opening provided in an upright 3 on the base plate. A rotary motion imparted to the member 2 will therefore be accompanied by the traverse of such member to and fro in one direction or the other. Rotary motion is in this instance imparted to such member and the threaded shank thereof by means of an internal driving shaft 4 slidably mounted within the threaded shank and connected therewith with a spline and key-way construction, such as indicated by 4′. This inner shaft is driven from a driving pulley 5, which, in turn, is rotated from some source of power (not shown), by means of bevel gears one of which 5′ attached to the shaft of the pulley engages on opposite sides with bevel gears 5″, 5″, one of which is rotatably mounted in a bearing in an upright 6 on the base plate, and the other of which is correspondingly mounted in a bearing in an upright 6′. The bevel gears 5″, 5″, are loose upon the shaft 4, but are each provided with a suitable clutch member as 7 adapted to engage with a counterpart clutch member 7′ fastened to the shaft. This counterpart clutch member 7′ is shiftable to and fro in line with the axis of the shaft to engage with one or the other of the clutch members on the bevel gears 5″, 5″, disengaging with one of these clutch members, however, before engaging with the other.

In the present embodiment, the alternate engagement of the clutch member 7′ first with one then with the other of the bevel gears to thereby effect the rotation of the shaft 4 in opposite directions (accompanied by a corresponding reverse in the direction of motion of the member 2) is effected through the operation of a shifter bar 8 working in guides 8′, 8′, on the base plate and attached to a fulcrumed link 8″ to which is pivoted a laterally extending arm 8‴ of the clutch member 7′. Stop pieces 9, 9, secured to this shifter bar in position such that they may engage with the member 2 as the latter approaches one or the other, effect the shifting of the shifter bar 8 from its position, and hence, renders first one and then the other of the bevel gears 5″ effective to rotate the shaft 4. By making the stop pieces 9 adjustable on the shifter bar it is evident that the length of the line of traverse of the member 2 axially of the shaft may be varied.

At some point in the line of its traverse that is, its longitudinal or translational movement, the member 2 engages with the second member comprised in the mechanism, and thereafter the motion of the two members concur, not only during the further forward traverse of the member 2, but also during the return of the latter and in fact until the second member shall have regained its position prior to the engagement, whereupon disengagement is automatically effected and the member 2 permitted to continue its backward movement. The second member 10, in the form of embodiment herein set forth, is capable of a movement identical in kind with that of the member 2. It likewise encircles the shaft 4 and a portion at least of its bore is threaded to engage with a threaded sleeve 11 concentrically disposed about the shaft 4 and fixedly secured in this particular instance by pinning (see the pin 11') the sleeve to the upright 6'.

Passing now to a description of means whereby the member 2 coöperates with the member 10 and becomes effective to drive the latter, this means will preferably comprise a part hereinbefore designated as the actuator, carried by the member 2, which is not only effective to drive the member 10, but may also conveniently serve to unlock the member 10 and release the latter from the position in which it is held during the time that it is not moving in synchronism with the member 2. The nature of the coöperation between the parts now to be described is such as to accomplish this result. An actuator 14 in the nature of a block secured by its stem 14' and holding pin 14" on the radial face of the member 2 is adapted to engage when in juxtaposition to the contiguous face of the member 10, with a movement-transmitter 12 fulcrumed on the member 10 by a rod 12' extending through an opening in the member 10 parallel with the axis of the latter and held in place by a nut 12" on its end. The stop face on the transmitter 12 with which the actuator engages is designated by 12$^b$. It will be noted furthermore that the fulcrumed transmitter is provided with a projecting toe 12$^c$. This latter is adapted to enter a notch 12$^d$ provided for it in the peripheral surface of the fixed threaded sleeve 11; the seating of this toe in the notch determines the fixed or normal position of the member 10.

Figure 1:
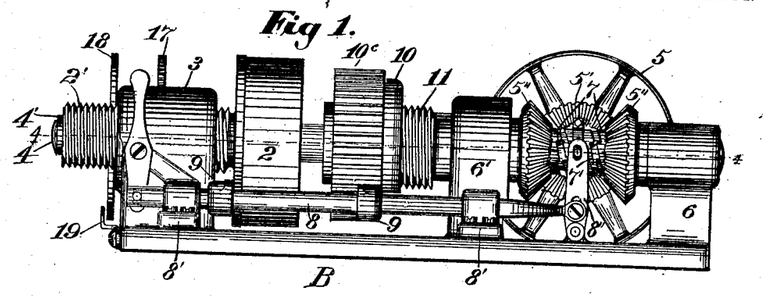
Figure 1 is a side elevation representing an organization of devices in which there is embodied the features of the present mechanical movement.
Figure 2:
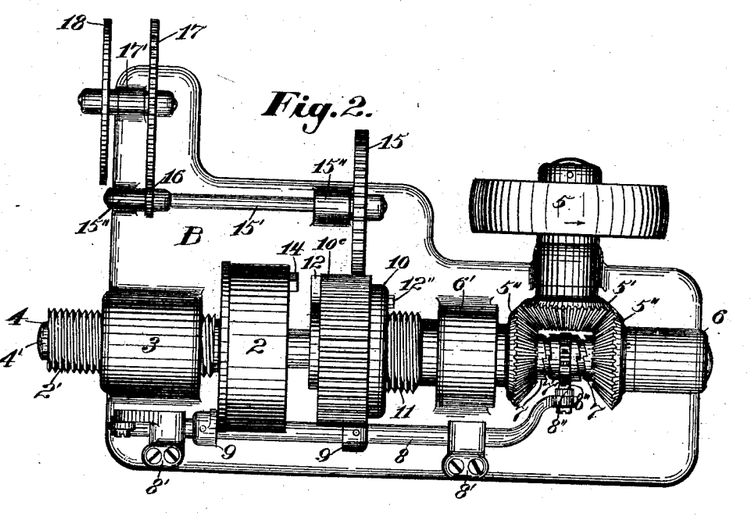
Fig. 2 is a plan view of Fig. 1.
Figure 3:
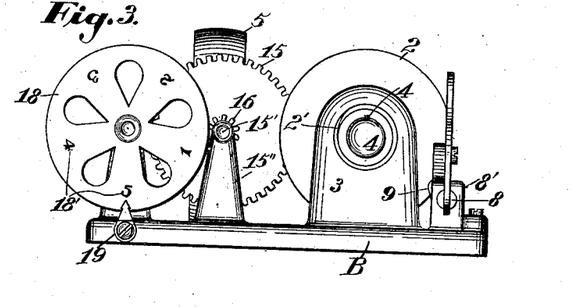
Fig. 3 is an end elevation looking from the left in Fig. 2.
Figure 4:
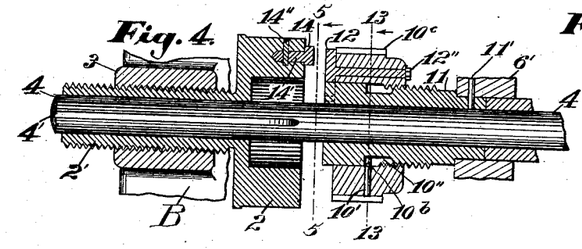
Fig. 4 is a longitudinal section on the plane of the line 4—4, Fig. 1; certain driving mechanism, however, being omitted in this figure.
Figure 5:
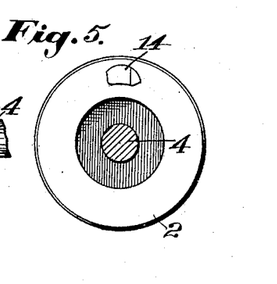
Fig. 5 is a cross-section on the plane of the line 5—5 in Fig. 4, looking in the direction of the arrow adjacent to that line.
Figure 6:
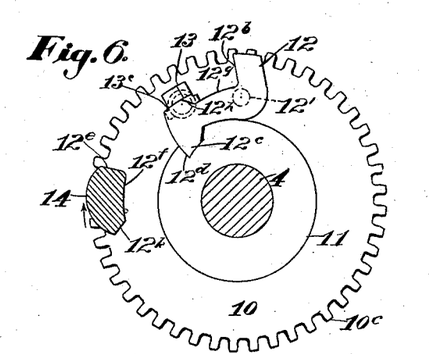
Figs. 6, 7 and 8 are enlarged sectional views, the section corresponding to the plane of the line 5—5 in Fig. 4, and each view representing, in elevation, the face of the second or driven member with the fulcrumed movement-transmitter mounted thereon and in coöperative relation with which is shown a latch designed to lock such transmitter and the second member in a given, definite position and to release the same when the engagement of the actuator shown in cross-section with such transmitter shall have taken place; these figures are intended to show the mode in which the actuator, the latch and the movement-transmitter coöperate during the operation of the mechanism, Fig. 6 indicating the transmitter in a locked position prior to the engagement of the actuator therewith, Fig. 7 indicating the position of the parts when the transmitter has been unlocked and the actuator becomes effective to withdraw the transmitter from its locked position, and Fig. 8 indicating the relative position of the various parts after the driven member has been shifted from its fixed or stationary position.
Figure 7:
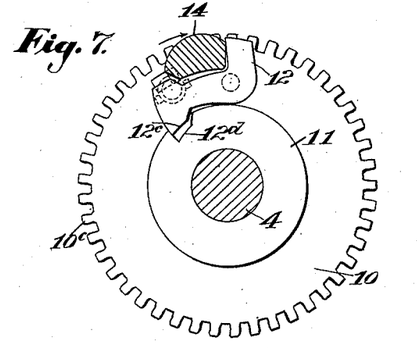
Figure 8:
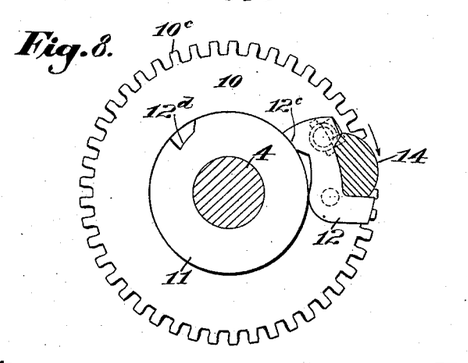
Figure 9:
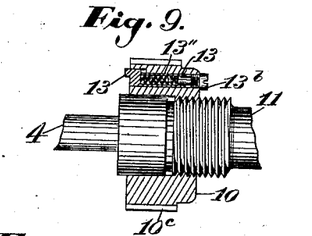
Fig. 9 is a view partly in longitudinal section and partly in elevation, the plane of the section corresponding to the median plane of the shank of the latch.
Figure 10:
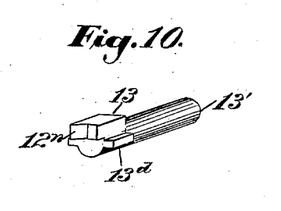
Fig. 10 is a detailed view of the latch.
Figures 11, 12, 13:
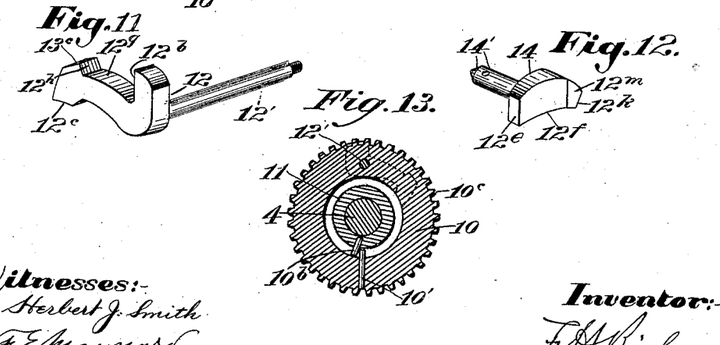
Figs. 11 and 12 are similar views of the movement-transmitter and actuator, respectively.
Fig. 13 is a cross-section on the plane of the line 13—13 in Fig. 4, indicating the means adopted in this instance for preventing the overrunning of the second member as it returns.

Assuming now that the member 2 carrying the actuator 14 is in motion and the latter is about to come into contact with the stop face 12$^b$ on the movement transmitter (the toe 12$^c$ in this position of the transmitter extending into the aforesaid notch 12$^d$) the result when engagement first takes place is to swing the transmitter slightly about its pivotal axis, thus lifting the toe out of the notch and releasing the member 10 which thereupon is free to be carried along with the member 2 as the latter rotates in the direction of the arrow, Figs. 6, 7 and 8, and traverses from left to right in Fig. 2. In order to facilitate the tilting tendency of the actuator upon the fulcrumed transmitter, the contacting surface 12$^e$ of the former is so disposed as to be somewhat inclined to the stop face 12$^b$ when it first strikes the same, but after the toe of the transmitter has been withdrawn from the notch the two surfaces come into firm and more or less full contact. During the continuance of the transmitted motion further tilting of the transmitter (tending to occur by reason of the force applied to the face 12$^b$) is prevented by the engagement of the lower face 12$^f$ of the actuator with the face of the arm 12$^g$ of the transmitter.

Upon the reversal of the motion of the shaft 4 and hence of the member 2, it is designed that the member 10 shall be carried backward with the member 2 until the former has reached the position it had prior to the engagement. Obviously the tendency of the driving force applied to move the member 10 reversely is to tilt the transmitter in the opposite direction and hence were not means provided for preventing the disengagement of the actuator from the transmitter, the actuator would free itself therefrom. To prevent this disengagement and render the actuator effective to reversely actuate the member 10, the transmitter is provided with a stop face 12$^h$ oppositely disposed to the stop face 12$^b$ and with which a coöperating face 12$^k$ on the actuator is adapted to engage. During this reverse motion the stop face 12$^h$ is held in position to coöperate with the driving face 12$^k$ by reason of the contact of the toe 12$^c$ with the smooth peripheral portion of the threaded sleeve 11. This reverse motion will continue until the toe is brought opposite the notch 12$^d$ whereupon the pressure against the face 12$^h$ (which is preferably slightly inclined to create a downward component) will operate to cause the retilting of the movement transmitter and effect the reseating of the toe in the notch 12$^d$. This re-engagement of the notch will release the actuator 14 which, together with the member 2 are thereupon free to continue their backward motion unaccompanied by the member 10.

To prevent the member 10 from overrunning its fixed predetermined position on the sleeve 11, it may be provided with a stop such as 10' which is free to move in the reduced peripheral portion 10" of the sleeve 11 during the movement of the member 10 away from its fixed position, but which stop when the member returns to its fixed position with the toe of the motion-transmitter in the notch 12$^d$, is arrested by a fixed stop piece 10$^b$ on the sleeve.

In a mechanism such as has been hereinbefore described the toe 12$^c$ on the movement-transmitter may fail to operate in the proper manner or properly perform its proper function as a means for holding the member 10 in a fixed predetermined relation with respect to the sleeve 11 during such times as the actuator is not engaged with the movement transmitter. In order that the proper operation of the toe may be assured I may combine with the fulcrumed movement-transmitter a latch for positively locking the latter in the position in which its toe 12$^c$ is engaged with the notch. In the form of such latch herein shown it comprises a latch proper 13 from which extends a tubular shank 13′ mounted in an opening in the member 10. A spring 13″ interposed between the bottom of the tubular shank 13′ and a threaded plug 13$^b$ presses the latch into a position such that it projects over the face 13$^c$ of the fulcrumed movement transmitter when the toe on the latter is seated in the notch 12$^d$. In this position of the latch therefore it is plain that the toe is prevented from rising out of the notch. Laterally projecting wings 13$^d$ on the latch work in recesses in the face of the member 10 and prevent the latch from angularly shifting.

For facilitating the rendering of the latch inoperative to hold down the fulcrumed transmitter, the actuator 14 is so formed as to push back the latch against the tension of the spring 13″, just prior to the engagement of the drive face 12$^e$ on the actuator with the stop face 12$^b$. In the form and construction of the parts illustrated this is effected by the inclined face 12$^m$ on the actuator which slides over the inclined face 12$^n$ on the latch.

It may happen that the application of the present mechanical movement to a particular mechanism or machine may require the utilization of the member 10 as a driver. To this end, this member may be formed with teeth 10$^c$ on its periphery; its function as a drive member is indicated in the drawings by its employment to shift an index, the simple means comprised in this portion of the device comprising a gear wheel 15 which engages with the teeth 10$^c$ and whose shaft 15′ is mounted in bearings 15″, 15″ on the base plate. A pinion 16 attached to this shaft meshes with a toothed wheel 17 mounted in a bearing 17′ to whose shaft there is attached an index plate 18. This index plate is shown as provided with index marks 18′ and by the position of the index plate with reference to a fixed pointer 19 serves to indicate the extent of motion and the relative position of the member 10.

A mechanism such as has been hereinbefore described operates substantially in the following manner: Assuming the pulley 5 to be in rotation and the parts in the position indicated in Fig. 2 in which the member 2 which will be assumed to have been in motion and to have acquired some momentum has come into engagement with the stop piece 9 at the left, and is in the act of shifting the shifter rod 8 toward the left. when the clutch member 7′ engages with the clutch member 7 of the left hand bevel gear 5″, the member 2 is rotated in a direction to cause its longitudinal movement to the right. During this period the member 10 is at rest. As the actuator 14 approaches the inclined face 12$^n$ on the latch 13, it forces the latch back against the tension of the spring 13″ releasing the movement-transmitter and when the drive face 12$^e$ comes into engagement with the stop face 12$^b$ of the transmitter, the latter is tilted and the toe 12$^c$ raised out of the notch 12$^d$. During the remaining longitudinal movement of the member 2 to the right the member 10 will move in synchronism with it until upon the shifting of the shifter rod 8 toward the right by reason of the engagement of the former member with the right hand stop piece 9, the clutch is shifted and the motion of the members reversed. They will, however, continue to move together during the reverse rotary and longitudinal movement until the toe 12$^c$ comes opposite the notch in the sleeve 11. It will then reënter the notch releasing the drive face 12$^k$ of the actuator from engagement with the opposed face 12$^h$ of the movement-transmitter and permitting the member 2 to continue its motion with the member 10 in its predetermined position. Immediately upon the disengagement of the actuator from the latch 13, the latter will spring forward locking the toe 12$^c$ from disengagement from the notch in which it is seated. Simultaneously with the arrival of the toe of the movement-transmitter opposite the receiving notch, further onward movement of the member 10 is precluded by the contacting of the stop 10′ with the stop pin 10$^b$.

Having thus described my invention, I claim:

1. The combination with an angularly movable driving member shiftable along a predetermined rectilinear path, of a latch, and an actuatable member also movable along a predetermined path and with which the driving member is constructed and adapted for engagement by a latch at some point in the path of movement of such driving member in its angular and rectilinear movement, and for continuing such engagement throughout the movement of the actuatable member.

2. The combination with an angularly movable driving member shiftable along a predetermined rectilinear path, of a latch, and an actuatable member also movable along a predetermined path and with which the driving member engages by a latch at some point in the line of movement of such driving member, and which engagement continues throughout the movement of the actuatable member in opposite directions.

3. The combination with a driving member movable along a predetermined path, of a latch, and an angularly movable actuatable member shiftable along a predetermined rectilinear path and with which the driving member engages at some point by a latch in the line of movement of such driving member, and which engagement continues throughout the movement of the actuatable member.

4. The combination with a driving member movable along a predetermined path, of a latch, and an angularly movable actuatable member shiftable along a predetermined path, and with which the driving member engages by a latch at some point in the line of movement of such driving member, and which engagement continues throughout the movement of the actuatable member in opposite directions.

5. The combination with an axially movable driving member shiftable along a predetermined rectilinear path, of a latch, and an angularly movable actuatable member also shiftable along a predetermined rectilinear path and with which the driving member engages by a latch at some point in the path of movement of such driving member and which engagement continues throughout the movement of said actuatable member.

6. The combination with an axially movable driving member shiftable along a predetermined rectilinear path, of a latch, and an angularly movable actuatable member also shiftable along a predetermined rectilinear path and with which the driving member engages by a latch at some point in the path of movement of such driving member, and which engagement continues throughout the movement of said actuatable member in opposite directions.

7. The combination with a rotative and axially shiftable driving member, of a latch, and an actuatable member having capacity for a less amount of axial movement than the driving member, and a movement transmitter through which motion is transmitted from the driving member by a latch to the actuatable member.

8. The combination with a rotative and axially shiftable driving member, of a latch, and an actuatable member having capacity for a less amount of axial movement than the driving member, a movement transmitter through which motion is transmitted by a latch from the driving member to the actuatable member and means for reversing the motion of the driving member.

9. The combination with a rotative and axially shiftable driving member, of a latch, and a rotative actuatable member movable in the line of axial movement of the driving member, and means for effecting engagement by a latch between the two at a predetermined point in the path of movement of the driving member and for continuing such engagement for a period.

10. The combination with a rotative and axially shiftable driving member, of a latch, and a rotative actuatable member movable in line with the axial movement of the driving member and a movement transmitter for transmitting motion from the driving member by a latch to the actuatable member.

11. The combination with a rotative and axially shiftable driving member, of a latch, and a rotative actuatable member movable in the line of axial movement of the driving member, means for effecting engagement by a latch between the two at a predetermined point in the path of movement of the driving member and for continuing such engagement for a period, and means for reversing the motion of the driving member.

12. The combination with a rotative and axially shiftable driving member, of a latch, and a rotative actuatable member movable in line with the axial movement of the driving member, a movement transmitter for transmitting motion from the driving member to the actuatable member by a latch and means for reversing the motion of the driving member.

13. The combination with a rotative and axially shiftable driving member, of an actuatable member having capacity for like movement, a movement transmitter through which motion is transmitted from the driving member to the actuatable member, means for reversing the motion of the driving member, and a locking device for locking the actuatable member in a predetermined position.

14. The combination with a rotative and axially shiftable driving member, of an actuatable member having capacity for a less amount of axial movement than the driving member, a movement transmitter through which motion is transmitted from the driving member to the actuatable member, means for reversing the motion of the driving member, and a locking device for locking the actuatable member in a predetermined position.

15. The combination with a rotative and axially shiftable driving member, of a rotative actuatable member movable in the line of axial movement of the driving member, means for effecting engagement between the two at a predetermined point in the path of movement of the driving member and for continuing such engagement for a period, and a locking device for locking the actuatable member in a predetermined position.

16. The combination with a rotative and axially shiftable driving member, of a rotative actuatable member movable in line with the axial movement of the driving member, a movement transmitter for transmitting motion from the driving member to the actuatable member, and a locking device for locking the actuatable member in a predetermined position.

17. The combination with a rotative and axially shiftable driving member, of a rotative actuatable member movable in the line of axial movement of the driving member, means for effecting engagement between the two at a predetermined point in the path of movement of the driving member and for continuing such engagement for a period, means for reversing the motion of the driving member, and a locking device for locking the actuatable member in a predetermined position.

18. The combination with a rotative and axially shiftable driving member, of a rotative actuatable member movable in line with the axial movement of the driving member, a movement transmitter for transmitting motion from the driving member to the actuatable member, means for reversing the motion of the driving member, and a locking device for locking the actuatable member in a predetermined position.

19. A fulcrumed movement transmitter in combination with two members and adapted for transmitting movement from one member to another and having opposed faces against either of which the driving force may be applied, said transmitter having a projection for locking one of the members in a predetermined position.

20. A fulcrumed movement transmitter in combination with two members and adapted for transmitting movement from one member to another and having opposed faces against either of which the driving force may be applied said transmitter having a projection for locking one of the members in a predetermined position, combined with an actuator adapted to engage with said opposed faces.

21. A fulcrumed movement transmitter in combination with two members and adapted for transmitting movement from one member to another and having opposed faces against either of which the driving force may be applied, a locking device controlled by said transmitter and a latch for precluding the shifting of said device from its locking position.

22. A fulcrumed movement transmitter in combination with two members and adapted for transmitting movement from one member to another and having opposed faces against either of which the driving force may be applied, a locking device controlled by said transmitter, and a spring-pressed latch for precluding the shifting of said device from its locking position.

23. A fulcrumed movement transmitter in combination with two members and adapted for transmitting movement from one member to another and having opposed faces against either of which the driving force may be applied, a locking device controlled by said transmitter, a latch for precluding the shifting of said device, from its locking position, and an actuator adapted for engaging with said opposed faces and to withdraw said latch.

24. A fulcrumed movement transmitter in combination with two members and adapted for transmitting movement from one member to another and having opposed faces against either of which the driving force may be applied a locking device controlled by said transmitter, a latch for precluding the shifting of said device from its locking position, and an actuator adapted to engage with said opposed faces and to release said latch.

25. The combination with a driving member and an actuatable member, of a fulcrumed movement transmitter for transmitting movement from one member to the other and having opposed faces against either of which the driving force may be applied, said transmitter having means for locking one of the members in a predetermined position.

26. The combination with a driving member and an actuatable member, of a fulcrumed movement transmitter for transmitting movement from one member to the other, and having opposed faces against either of which the driving force may be applied, said transmitter having means for locking one of the members in a predetermined position and an actuator adapted to engage with said opposed faces.

27. The combination with a driving member and an actuatable member, of a fulcrumed movement transmitter for transmitting movement from one member to the other and having opposed faces against either of which the driving force may be applied, said transmitter having a projection for locking one of the members in a predetermined position and a latch for precluding the shifting of the transmitter from its locking position.

28. The combination with a driving member and an actuatable member, of a fulcrumed movement transmitter for transmitting movement from one member to the other, and having opposed faces against either of which the driving force may be applied, said transmitter having a projection for locking one of the members in a predetermined position and a spring-pressed latch for precluding the shifting of the transmitter from its locking position.

29. The combination with a driving member and an actuatable member, of a fulcrumed movement transmitter for transmitting movement from one member to the other, and having opposed faces against either of which the driving force may be applied said transmitter having a projection for locking one of the members in a predetermined position and a latch for precluding the shifting of the transmitter from its locking position, and an actuator adapted to engage with said opposed faces and to withdraw said latch.

30. The combination with a driving member and an actuatable member, of a fulcrumed movement transmitter for transmitting movement from one member to the other, and having opposed faces against either of which the driving force may be applied, said transmitter having a projection for locking one of the members in a predetermined position and a spring-pressed latch for precluding the shifting of the transmitter from its locking position, and an actuator adapted to engage with said opposed faces and to release said latch.

31. The combination with a driving member and an actuatable member, of a fulcrumed movement transmitter for transmitting movement from one member to the other, and having opposed faces against either of which the driving force may be applied, said transmitter having a projection for locking one of the members in a predetermined position, an actuator adapted to engage with said opposed faces, and means for automatically reversing the motion of the driving member.

32. The comination with a driving member and an actuatable member, of a fulcrumed movement transmitter for transmitting movement from one member to the other, and having opposed faces against either of which the driving force may be applied, said transmitter having a projection for locking one of the members in a predetermined position, and a latch for precluding the shifting of the transmitter from its locking position and means for automatically reversing the motion of the driving member.

33. The combination with a driving member and an actuatable member, of a fulcrumed movement transmitter for transmitting movement from one member to the other, and having opposed faces against either of which the driving force may be applied, said transmitter having a projection for locking one of the members in a predetermined position, and a spring pressed latch for precluding the shifting of the transmitter from its locking position and means for automatically reversing the motion of the driving member.

34. The combination with a driving member and an actuatable member, of a fulcrumed movement transmitter for transmitting movement from one member to the other, and having opposed faces against either of which the driving force may be applied, said transmitter having a projection for locking one of the members in a predetermined position, and a latch for precluding the shifting of the transmitter from its locking position, an actuator adapted to engage with said opposed faces and to withdraw said latch, and means for automatically reversing the motion of the driving member.

35. The combination with a driving member and an actuatable member, of a fulcrumed movement transmitter for transmitting movement from one member to the other, and having opposed faces against either of which the driving force may be applied, said transmitter having a projection for locking one of the members in a predetermined position, and a spring-pressed latch for precluding the shifting of the transmitter from its locking position, an actuator adapted to engage with said opposed faces and to release said latch, and means for automatically reversing the motion of the driving member.

36. The combination with a driving member 2, of the actuatable member 10, and the member 11 provided with a notch $12^d$, the actuator 14 mounted on the driving member and having engaging faces $12^e$ and $12^k$, and the fulcrumed movement transmitter 12 mounted on the actuatable member and having the opposed faces $12^b$ and $12^h$ for respectively engaging the said faces $12^e$ and $12^k$ and the toe $12^c$ for engaging the notch $12^d$.

37. The combination with a member 2 having a threaded shank $2'$, of the actuatable member 10, the fixed threaded sleeve 11, the actuator 14 mounted on the driving member, and the fulcrumed movement transmitter 12 mounted on the actuatable member, and having opposed faces $12^b$ and $12^h$ and the toe $12^c$ adapted to engage with a notch $12^d$ in the sleeve 11.

38. The combination with a screw shaft and a driving member mounted upon the said screw shaft and movable along a predetermined path, an actuatable member mounted upon the said screw shaft and movable along a predetermined path and with which the driving member may engage at some point in the line of movement of such driving member, and which engagement continues throughout the movement of the actuatable member in opposite directions.

39. The combination with a driving member rotatably mounted and adapted to move through a predetermined path, of a latch, and an actuator also mounted for movement along a predetermined path and with which the driving member may engage by a latch at some point in the path of movement, and means for prolonging such engagement.

40. The combination with a driving member angularly movable in reverse directions and reciprocatory in an axial path, of a driven member angularly movable in reverse directions and reciprocatory in an axial path, and means of connection therebetween for causing said driving member to reciprocate said driven member through a portion only of its path of movement and to contemporaneously angularly move the same.

41. The combination with a driving member and means for angularly moving the driving member in reverse directions and reciprocating the same in an axial path, of a driven member angularly movable in reverse directions, and means of connection between the driving member and the driven member for causing said driving member to impart its angular movement to the driven member and to reciprocate the same throughout a portion only of each of the excursions of the said driving member.

Signed at Nos. 9–15 Murray street, New York, N. Y. this 12th day of November, 1902.

FRANCIS H. RICHARDS.

Witnesses:
 PIERSON L. WELLS,
 JOHN O. SEIFERT.